Oct. 11, 1955  G. BUNGAS  2,720,385
SMOKE-ARRESTING APPARATUS
Filed April 20, 1953
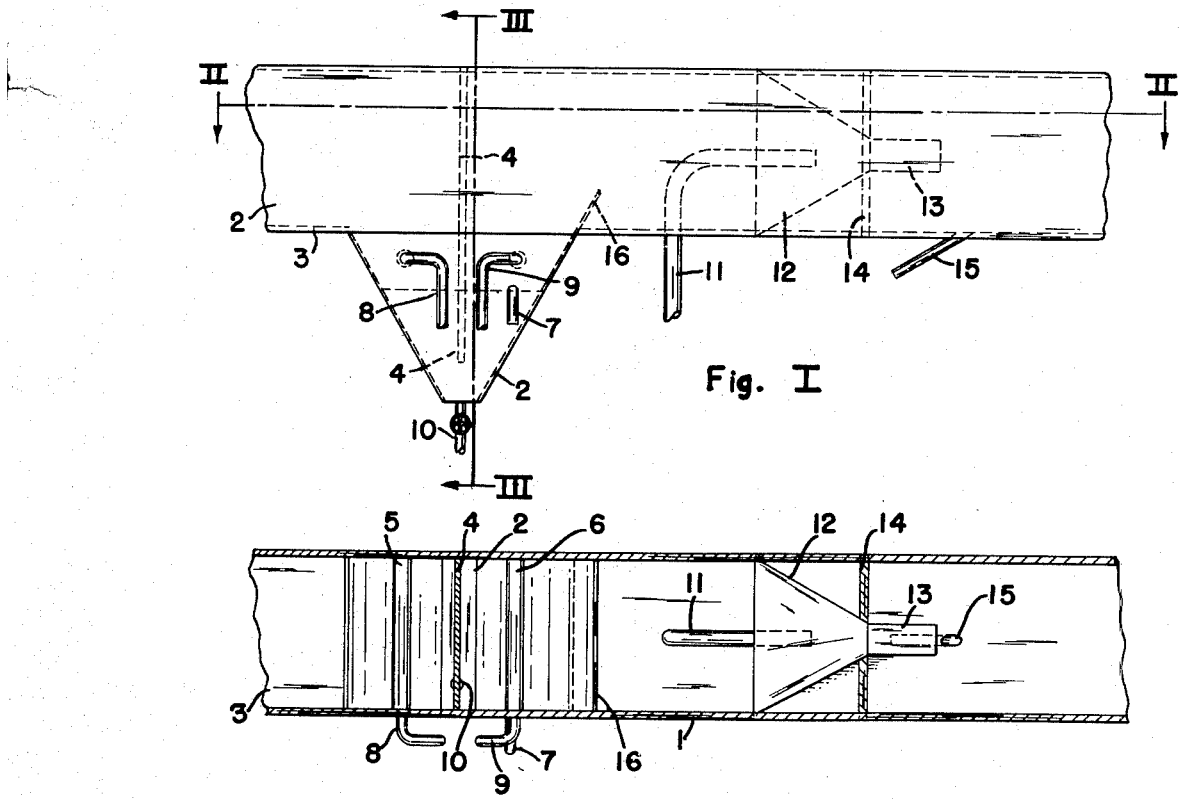
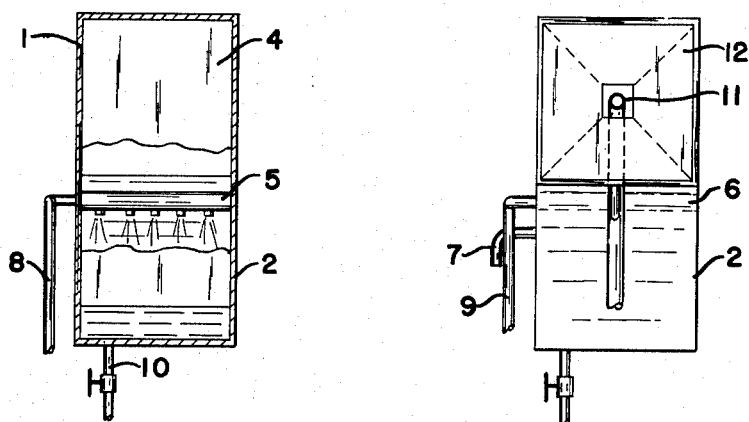
Fig. III  Fig. IV
INVENTOR
George Bungas
BY
William B. Wharton
ATTORNEY

United States Patent Office 2,720,385
Patented Oct. 11, 1955

2,720,385

SMOKE-ARRESTING APPARATUS

George Bungas, Pittsburgh, Pa.

Application April 20, 1953, Serial No. 349,807

3 Claims. (Cl. 261—17)

This invention relates to a smoke-arresting system or apparatus which is simple and effective and which can be embodied in structures differing widely in the scale on which they are made without affecting the effectiveness of the apparatus.

The system, or apparatus, hereinafter described thus is susceptible to embodiment in large-scale installations in manufacturing plants and conversely is particularly desirable in small-scale embodiment for installation in office buildings, apartment houses, hotels and the like for which large, complex and expensive smoke-arresting installations are inappropriate.

The object of the invention is to provide apparatus capable of removing a maximum of solid matter from discharged furnace gases consistent with the simplicity of the apparatus.

In attaining that object the furnace gases are caused to follow a definite course through a substantial depth of water, which water stands as a body without being broken up into a spray or curtain by undue agitation. This is effected primarily by circulating the gases through a standing body of water under the negative pressure created by the normal furnace draft supplemented by an applied induction effect.

In the accompanying drawings illustrating the embodiment of my invention:

Fig. I is a side elevation of my smoke-arresting apparatus.

Fig. II is a horizontal sectional view taken in the plane of the section line II—II of Fig. I.

Fig. III is a cross-sectional view through the apparatus taken in the plane of the section line III—III of Fig. I.

Fig. IV is an end elevation of my smoke-arresting apparatus.

In the accompanying drawings reference numeral 1 designates a portion of a duct for conveying furnace gases from the smoke box of a furnace to a stack. Because those instrumentalities can be considered as both conventional and variable they are omitted from illustration in the drawings. Duct 1 may be of any desired cross-sectional contour, but is shown as square, that contour being most conformable to the installation of the apparatus and to the connection of the duct with other elements of the apparatus. The direct smoke-arresting element of the apparatus is a water-containing washing tank 2, which extends the width of duct 1 and is V-shape in cross-section. Above tank 2 the lower wall 3 of duct 1 is cut away to provide extended communication between the tank and the interior of the duct in a plane above the water level in the tank. As shown the opening in the bottom wall 3 of duct 1 is co-extensive with the area of tank 2 in the uppermost and most extended region thereof. In the region above tank 2 there is a deflector partition 4 which completely closes the space within the body proper of the duct and prevents undeflected passage of gases therethrough. Deflector partition 4 extends downwardly for the major proportion of the tank's depth and substantially below the surface of a body of water maintained in the tank.

Water is supplied most advantageously to washing tank 2 by means of spray tubes 5 and 6 disposed on opposite sides of the deflector 4. These spray tubes perform a dual function in the apparatus. Spray tubes 5 and 6 serve to wash the walls of the tank when it has been emptied for cleaning. Their other function is to distribute fresh, cool water at the surface of the body of water standing in the tank to knock down vapors rising from the surface of that body of water and generally to minimize the evolution of steam therein. Tubes 5 and 6 may provide the entire volume of water for the tank or the volume delivered by them may be supplemented in any desired manner. At least one waste pipe 7 communicates with the interior of tank 2 at a convenient height to maintain a constant level of water in the tank. Water connections 8 and 9 provide washing water for spray tubes 5 and 6. At the bottom of the tank there is a valved drain pipe 10. It should be understood that the smoke-arresting apparatus of my invention operates in a manner which is economical with respect to the volume of water which is used. In certain districts and under certain conditions this economy in water consumption is a matter of great importance. This is particularly a fact in installations with which the provision of settling tanks for reuse of the water is inexpedient.

In use of the apparatus furnace gases follow the course hereinafter described. It is to be understood that the general direction in which the gases travel is from left to right with respect to Figs. I and II of the drawings. The gases pass through their course under normal draft assisted by an induction or eduction effect created in the interior of the duct on the discharge side of tank 2. This effect is created by an air line 11 connected with a blower or other source of air under pressure. Air duct 11 opens interiorly of a funnel 12 the extended side of which is made completely to fill the interior of the duct at that point, and the pipe is directed toward the constricted portion 13 of the funnel. As shown funnel 12 is supported by means of a partition or bracket 14 which partition or bracket need not close off the duct inasmuch as the funnel itself serves as a partition there. Closely beyond the discharge end of funnel 12 a breather pipe 15 places the interior of the duct in communication with the atmosphere and permits air to be drawn into the tank to mix with the furnace gases therein.

In operation the natural draft of the stack associated with the furnace is supplemented and augmented by the suction effect produced cooperatively by air nozzle 11 and funnel 12. There thus is created in tank 2 an effective negative pressure which tends to draw the furnace gases through the water in the tank and carry them to discharge. On its discharge side tank 2 is provided with a splash apron 16 which projects upwardly into the interior of duct 1 to prevent splashing of water into the duct. Passage of furnace gases through the washing water without undue agitation and splashing is rendered possible by the extended area of communication between duct 1 and washing tank 2. The result of this extended area of communication is to avoid marked increase in the velocity of the gases which occur if they were to be introduced beneath the water level in the tank by way of pipes of relatively restricted cross-sectional area. As shown, the opening of tank 2 on each side of the deflector partition 4 extends the entire width of duct 1 and for a substantial distance longitudinally of the duct. Whereas there is no requirement that specific dimensions or specific relative dimensions be provided in the opening between the duct and the tank, it is important that the opening be of substantial dimensions with respect to the cross-sectional area of the duct.

The washing effect produced in the apparatus above described is particularly thorough. Furnace gases impinging against deflector partition 4 pass downwardly in the tank on that side of deflector partition 4 which lies toward the furnace from which the gases emanate. Adjacent the bottom of the tank the gases pass under the lower end of partition 4 and then upwardly in that section of the tank which lies toward the stack associated with the apparatus. Upon issuance from the body of water in the tank the gases are then carried along through the duct to discharge at the stack. During the described action fresh washing water is maintained in the tank by delivery from spray tubes 5 and 6 and is discharged by way of waste pipe 7. The advantage of introducing fresh, cool water in divided condition as by sprays at or adjacent the surface of the body of water in the tank is readily understandable. Because such cool water tends to sink toward the bottom of the tank while water is drawn off at waste pipe 7, the distributed introduction of the cool water is particularly effective in preventing the discharge of steam into the conveying duct for the gases.

When the sides of the tank appear to have been coated with solid matter from the furnace gases to an undesirable extent the valve of drain pipe 10 is opened and tank 2 is drained. Spray from tubes 5 and 6 then washes the sides of the tank and carries out the deposited solid matter. Whereas the system of my invention finds its primary utility by providing a simple and convenient smoke-arresting method, it is useful in cleansing gases of all sorts of suspended solid matter.

The foregoing illustrates my invention by describing one structural embodiment thereof and the functioning of the structure as so embodied. It is to be understood, however, that various modifications in structure and function may be made within the bounds of my invention and that invention is to be limited therefore only by the claims appended hereto.

I claim as my invention:

1. Smoke-arresting apparatus comprising a conveying duct for furnace gases, a water-tank disposed regionally below said duct and in extended communication with the interior thereof, said water tank being V-shape in a plane extended longitudinally of the said duct, a deflector partition closing the duct above the tank and extended downwardly in the said tank to a point adjacent the bottom thereof to direct smoke downwardly to the constricted region of the tank on one side of the said partition and upwardly on the other side thereof, a drain at the bottom of the said tank, spray nozzles disposed below the upper level of the tank on both sides of the said partition to deliver jets of water adjacent the sides of the tank and adjacent the surface of the body of water therein to wash deposited matter from the sides of the tank to the said drain in cleaning the tank and to quell steam and agitation at the surface of the body of water in the tank and condense solid matter in the smoke during operation of the apparatus, and an induction assembly arranged to create negative pressure in the said duct on the discharge side of the said partition and on the tank at that side of the partition; the form and location of the said tank and the said partition, the arrangement of the said sprays and the action of the said assembly for the creation of negative pressure contributing to the precipitation of solid matter from the smoke with minimized agitation of the washing water.

2. Smoke-arresting apparatus in accordance with the statement of claim 1 having additionally a breather pipe disposed on the discharge side of the said induction assembly.

3. Smoke-arresting apparatus in accordance with the statement of claim 1 having additionally a splash apron extended upwardly from the tank wall into the duct at the discharge side of the tank.

References Cited in the file of this patent

UNITED STATES PATENTS

| Number | Name | Date |
|---|---|---|
| 517,297 | Reiss | Mar. 27, 1894 |
| 704,199 | Lee | July 8, 1902 |
| 2,379,396 | Zilioto | June 26, 1945 |
| 2,459,635 | Fenn | Jan. 18, 1949 |